US010426085B2

(12) United States Patent
Cavkusic et al.

(10) Patent No.: US 10,426,085 B2
(45) Date of Patent: Oct. 1, 2019

(54) CENTRIFUGAL FAN ROTOR AND APPARATUS INCORPORATING THE CENTRIFUGAL FAN ROTOR

(71) Applicant: Crary Industries, Inc., West Fargo, ND (US)

(72) Inventors: Damir Cavkusic, Fargo, ND (US); Ben Richard, Fargo, ND (US); Michael Leach, Fargo, ND (US); Mitchell Lee, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 290 days.

(21) Appl. No.: 15/376,824

(22) Filed: Dec. 13, 2016

(65) Prior Publication Data

US 2018/0163742 A1    Jun. 14, 2018

(51) Int. Cl.
*A01D 41/12*    (2006.01)
*F04D 29/28*    (2006.01)
(Continued)

(52) U.S. Cl.
CPC ........... *A01D 41/12* (2013.01); *F04D 29/282* (2013.01); *F04D 29/289* (2013.01); *F04D 29/30* (2013.01);
(Continued)

(58) Field of Classification Search
CPC .......... F04D 29/28; F04D 29/289; F04D 1/00; F04D 17/08; F04D 17/122; F04D 29/282; F20C 3/103; F24F 1/0022
(Continued)

(56) References Cited

U.S. PATENT DOCUMENTS 1,674,674 A * 6/1928 Wooster ............... B64C 11/205
                                                    29/889.6
2,653,755 A * 9/1953 Kruhmin ............... F04D 29/282
                                                    416/184
(Continued)

FOREIGN PATENT DOCUMENTS

WO    2016/143197 A1    9/2016

OTHER PUBLICATIONS

L. Quintino, "Overview of coating technologies," Surface Modification by Solid State Processing, May 9, 2014. [Online]. Available: https://www.sciencedirect.com/science/article/pii/B9780857094681500013. [Accessed: Nov. 19, 2018]. (Year: 2014).*

(Continued)

*Primary Examiner* — Jason D Shanske
*Assistant Examiner* — Hakeem M Abdellaoui
(74) *Attorney, Agent, or Firm* — Wood, Phillips, Katz, Clark & Mortimer (57) ABSTRACT

A centrifugal fan rotor having a frame with a rotary axis and a plurality of blades on the frame at circumferentially spaced locations around the rotary axis. The plurality of blades each has a leading edge and a trailing edge radially outside of the leading edge. The plurality of blades each has circumferentially oppositely facing first and second surfaces each extending between respective leading and trailing edges. The plurality of blades each has a material bonded at the leading edge and over only a portion of the exposed surface area of one of the first and second surfaces.

25 Claims, 6 Drawing Sheets

(51) Int. Cl.
*F04D 29/30* (2006.01)
*A01D 57/01* (2006.01)
*A01F 12/44* (2006.01)

(52) U.S. Cl.
CPC ............ *A01D 57/01* (2013.01); *A01F 12/444* (2013.01); *F05D 2230/234* (2013.01); *F05D 2230/54* (2013.01); *F05D 2240/303* (2013.01)

(58) Field of Classification Search
USPC ...................................................... 416/241 R
See application file for complete search history.

(56) References Cited

U.S. PATENT DOCUMENTS

| | | | | |
|---|---|---|---|---|
| 4,006,999 | A * | 2/1977 | Brantley | F01D 5/282 |
| | | | | 416/224 |
| 4,441,857 | A * | 4/1984 | Jackson | F04D 29/289 |
| | | | | 415/206 |
| 4,565,495 | A * | 1/1986 | MacLeod, Jr. | F04D 29/289 |
| | | | | 416/184 |
| 4,605,174 | A * | 8/1986 | Maliszewski | B02C 15/001 |
| | | | | 241/119 |
| 4,874,293 | A * | 10/1989 | Gutzwiller | F04D 29/281 |
| | | | | 416/184 |
| 5,340,530 | A * | 8/1994 | Coulon | B22F 5/04 |
| | | | | 419/49 |
| 5,375,978 | A * | 12/1994 | Evans | B64C 11/26 |
| | | | | 416/224 |
| 5,448,828 | A * | 9/1995 | Willems | B22F 7/06 |
| | | | | 29/889.1 |
| 6,154,959 | A * | 12/2000 | Goodwater | B23P 6/002 |
| | | | | 29/889.1 |
| 9,848,534 | B1 * | 12/2017 | Cavkusic | A01D 57/10 |
| 9,982,684 | B2 * | 5/2018 | Moricca | B23K 26/342 |
| 2005/0169757 | A1 * | 8/2005 | Chen | F04D 29/283 |
| | | | | 416/179 |
| 2007/0160476 | A1 * | 7/2007 | Cheng | B23P 6/007 |
| | | | | 416/193 A |
| 2009/0162207 | A1 * | 6/2009 | Peters | B23K 26/10 |
| | | | | 416/224 |
| 2011/0229338 | A1 * | 9/2011 | Voong | F04D 29/023 |
| | | | | 416/241 B |
| 2012/0201680 | A1 * | 8/2012 | Hall | F04D 29/023 |
| | | | | 416/178 |
| 2013/0101451 | A1 * | 4/2013 | Dickinson | F04D 25/0613 |
| | | | | 417/423.7 |
| 2014/0064937 | A1 * | 3/2014 | Kray | F01D 11/08 |
| | | | | 415/173.2 |
| 2014/0072715 | A1 * | 3/2014 | Jones | F01D 5/286 |
| | | | | 427/367 |
| 2014/0093376 | A1 * | 4/2014 | Giovannetti | B29C 37/0032 |
| | | | | 416/181 |
| 2014/0119922 | A1 * | 5/2014 | Nakano | F04D 29/30 |
| | | | | 416/189 |
| 2015/0118054 | A1 * | 4/2015 | Zerelles | F04D 29/282 |
| | | | | 416/178 |
| 2015/0202723 | A1 * | 7/2015 | Wilson | B21D 53/78 |
| | | | | 29/889.21 |
| 2015/0233257 | A1 * | 8/2015 | Fujiya | F01D 5/288 |
| | | | | 416/224 |
| 2016/0160661 | A1 * | 6/2016 | Balbach | C09K 3/1436 |
| | | | | 416/241 R |
| 2016/0312791 | A1 * | 10/2016 | Bellaci | F04D 29/023 |
| 2018/0128283 | A1 * | 5/2018 | Acosta | B32B 7/12 |

OTHER PUBLICATIONS

Q. Lai, "Investigation of a novel functionally graded material for the repair of premium hypereutectoid rails using laser cladding technology," Aug. 1, 2017. [Online]. Available: https://www.sciencedirect.com/science/article/pii/S1359836816331134. [Accessed: Nov. 19, 2018]. (Year: 2017).*

P. L. Ke, Y. N. Wu, and C. Sun, "Detonation gun sprayed thermal barrier coatings," Thermal Barrier Coatings, Mar. 27, 2014. [Online]. Available: https://www.sciencedirect.com/science/article/pii/B9781845696580500090. [Accessed: Nov. 19, 2018]. (Year: 2014).*

Office Action dated Nov. 18, 2018 in Canadian Patent Application No. 2,988,738.

* cited by examiner

CENTRIFUGAL FAN ROTOR AND APPARATUS INCORPORATING THE CENTRIFUGAL FAN ROTOR

FIELD OF THE INVENTION

This invention relates to centrifugal fans and, more particularly, to a centrifugal fan rotor having blades with a material bonded thereto to make the blades more resistant to abrasive wear.

BACKGROUND ART

Centrifugal fans are used in many different industries to generate pressurized flow or vacuum to perform myriad functions. Centrifugal fans have a number of advantages over positive-displacement blowers, which makes them preferable for certain applications.

Centrifugal fans are widely used in the agricultural industry and are incorporated to perform a range of functions relating to: a) planting crops; b) harvesting crops; c) treating crops as through the application of fertilizer and other additives; d) handling crops; e) handling agricultural debris; f) preparing ground for planting of crops, etc. Regardless of their specific function, the centrifugal fans in the agricultural environment are commonly exposed to extreme conditions. The air that is handled by the centrifugal fans generally has abrasive particulate entrained therein, be it from the soil, crops, crop debris, soil and crop treating additives, etc.

Heretofore, centrifugal fan rotors have been made with a relatively lightweight blade construction based upon considerations of economy, efficiency of operation, etc. Rotors with blades made from relatively light gauge metal sheet material are common.

Thin blades on fan rotors are prone to wearing quickly in the agricultural environment. In a typical harvesting operation that utilizes a centrifugal fan to perform one or multiple functions in association with harvesting equipment, potentially large volumes of small particulate and even larger foreign matter may be passed into and out of the fan. A large percentage of this foreign matter may directly contact the rotor blades responsible for high volume air handling. Typically encountered chaff, dust, debris, etc. has the capability of wearing blades, made even from steel, to the point that they fail in potentially a single day's activity. For example, some constructions may be such that the steel blades may have to be replaced after harvesting crop in a 200-300 acre field. Blades made from other, softer materials, such as aluminum, would be expected to wear even more quickly and extensively.

One potential solution to the abrasive wear problem is to make the blades from a thicker material. This in turn necessitates a larger drive capability which puts additional strain on the power source, which is typically a power take-off on a vehicle which is responsible for advancing the various agricultural equipment throughout a field.

In the event of a failure of one or more blades on a centrifugal fan rotor, operations may need to be halted to allow the defective rotor(s) to be repaired or replaced. In a harvest season with shortened daylight hours, and potentially many days with inclement weather that make harvesting impractical or impossible, minimizing downtime is critical to profitability.

Furthermore, blade failure on rotors turning at high speeds could inflict damage on the surrounding housing, the turning shaft, and potentially other equipment parts on or in the vicinity of the fan structure.

Users of centrifugal fans in any environment wherein abrasive is entrained in the handled air are always seeking designs of rotors that maximize the often competing objectives of reducing weight, reducing down time, increasing durability and extending system life, and ensuring affordability.

For example, while a welded structure may have excellent strength and durability, the welding process can be relatively expensive, particularly with a design requiring separate welding of each of multiple blades.

Some designs rely upon strategic blade bending to effect securement. This type of construction generally limits the gauge of the material from which the blades can be formed. Heavy gauge materials may be prone to failure upon being bent in certain ways. While lighter gauge materials reduce weight, the blades formed therefrom may be more prone to detrimental wear in normal use.

SUMMARY OF THE INVENTION

In one form, the invention is directed to a centrifugal fan rotor having a frame with a rotary axis and a plurality of blades on the frame at circumferentially spaced locations around the rotary axis. The plurality of blades each has a leading edge and a trailing edge radially outside of the leading edge. The plurality of blades each has circumferentially oppositely facing first and second surfaces each extending between respective leading and trailing edges. Each of the first and second surfaces has an exposed area. The plurality of blades each has a material bonded at the leading edge and over only a portion of the exposed surface area of one of the first and second surfaces.

In one form, the blades are made from a base metal and the bonded material is also metal.

In one form, the bonded metal is different than the base metal.

In one form, the leading edge of each of the plurality of blades has an axial length. The material is bonded over only a portion of the axial length of the leading edge of each of the plurality of blades.

In one form, each of the plurality of blades is spaced from the rotary axis and all of the plurality of blades have either a forward-curved or a backward-curved shape.

In one form, each of the plurality of blades has an axial length and a radial width. The material on each of the plurality of blades is bonded to the exposed area of one of the first and second surfaces over less than a full extent of each of the axial blade length and radial blade width.

In one form, each of the plurality of blades has an axial length and a radial width. The material on each of the plurality of blades is bonded to the exposed area of one of the first and second surfaces in an elongate strip form adjacent the leading edge.

In one form, the strip has a radial width and an axial length. The radial width of the strip is less than one half the radial width of the blade.

In one form, the bonded material is applied through a laser cladding process.

In one form, each of the plurality of blades has a substrate layer made from a base material having a first thickness. The bonded material has a second thickness equal to at least one third the first thickness.

In one form, the substrate layer is a formed flat sheet with a substantially uniform thickness.

In one form, the material is bonded to each of the plurality of blades on only one of the first and second surfaces.

In one form, the centrifugal fan rotor has a wall with an axially facing surface. Each of the plurality of blades has an axial length between spaced ends. One of the spaced ends on each of the plurality of blades is connected to the wall.

In one form, the bonded material on the one of the first and second surfaces on each of the plurality of blades extends on each of the plurality of blades from the one blade end towards but not to the other blade end.

In one form, each of the plurality of blades is made from a base metal. The bonded material is placed on a melt pad of the base metal, In one form, the flat sheet thickness is in the range of 0.05-0.07 inches.

In one form, the plurality of blades each has a thickness. The base material increases the blade thickness and has a thickness of at least 0.02 inches.

In one form, the invention is provided in combination with: a) a housing bounding a chamber within which the centrifugal fan rotor resides and defining an inlet for communicating incoming air to the chamber and an outlet for communicating air pressurized in the chamber by the centrifugal fan rotor from the chamber; and b) a drive for turning the rotor around the rotary axis.

In one form, each of the plurality of blades has a forward-curved shape.

In one form, the invention is provided in further combination with a piece of agricultural equipment that uses at least one of a pressurized air supply and vacuum to at least one of: a) plant crops; b) harvest crops; c) treat crops or ground in which crops are planted; d) handle crops; e) handle agricultural debris; and f) prepare ground for planting of crops.

DETAILED DESCRIPTION OF THE PREFERRED EMBODIMENT

Figure 1:
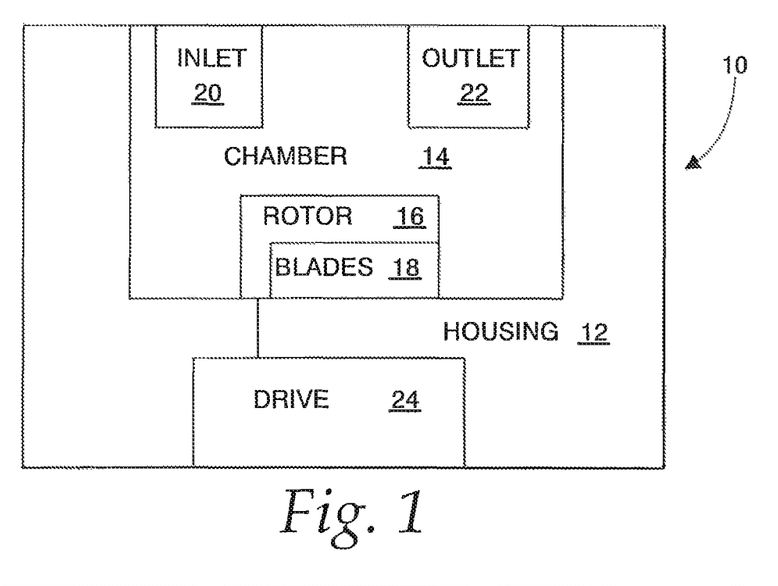
FIG. 1 is a schematic representation of a centrifugal fan, according to the invention.

In FIG. 1, a centrifugal fan, according to the present invention, is shown schematically at 10. The centrifugal fan 10 has a housing 12 bounding a chamber 14 within which a rotor 16 is mounted. The rotor 16 has a plurality of blades 18. As the rotor 16 is turned around its operating axis, environmental air is drawn through an inlet 20 into the chamber 14. The turning blades 18 increase the speed and volume of the air within the chamber 14, with the resulting pressurized air discharged from the chamber 14 through a housing outlet 22. The rotor 16 is turned by an appropriate drive 24.

With the above construction, vacuum is created at the inlet 20. A continuous supply of pressurized air is discharged at the outlet 22.

The schematic showing of the centrifugal fan 10 is intended to encompass a multitude of different constructions into which the invention can be incorporated. The schematic showing is intended to encompass designs having different component configurations and different interactions of those components. As just one example, the blades 18 might have many different configurations, including radial, forward-curved, backward-curved, etc.

While the centrifugal fan 10, made according to the present invention, has applications in many different industries, it has particular utility incorporated into agricultural equipment that operates in environments wherein handled air has entrained materials that are inherently abrasive. The abrasive material may be dirt or dust that is caused to be elevated from a field as various agricultural processes are carried out. Airborne particles that are encountered may also originate from crops, crop debris, seed, additives to soil or crop to facilitate planting, promote growth, eliminate weeds, etc. The inventive centrifugal fan 10 can be incorporated into any processing equipment that requires a source of vacuum or pressurized air and which is required to handle air in which there is potentially abrasive, airborne material. The agricultural applications described herein are intended to be exemplary in nature only.

Figure 2:
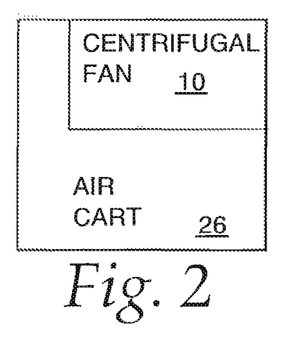
FIG. 2 is a schematic representation of an air cart incorporating the centrifugal fan of FIG. 1.
Figure 3:
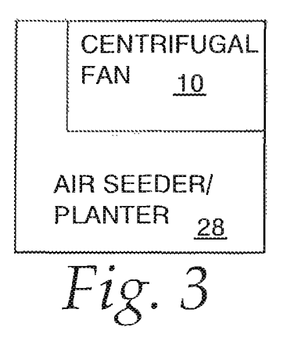
FIG. 3 is a schematic representation of an air seeder/planter incorporating the centrifugal fan of FIG. 1.
Figure 4:
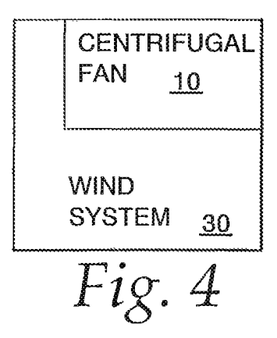
FIG. 4 is a schematic representation of an agricultural wind system incorporating the centrifugal fan of FIG. 1.
Figure 5:
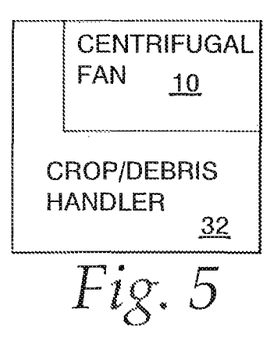
FIG. 5 is a schematic representation of a crop/debris handler incorporating the centrifugal fan of FIG. 1.
Figure 6:
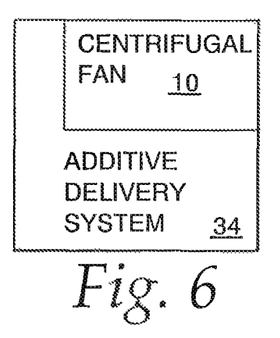
FIG. 6 is a schematic representation of an additive delivery system incorporating the centrifugal fan of FIG. 1.
Figure 7:
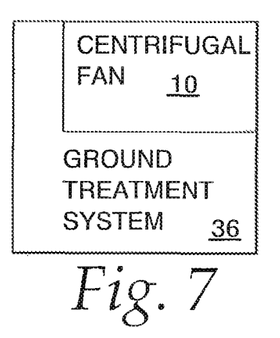
FIG. 7 is a schematic representation of a ground treatment system incorporating the centrifugal fan of FIG. 1.

As examples of agricultural applications, the inventive centrifugal fan 10 might be incorporated into: a general purpose agricultural air cart 26, as shown in FIG. 2; an air seeder/planter as shown schematically at 28 in FIG. 3; a general purpose wind system as shown schematically at 30 in FIG. 4; a crop/debris handler as shown at 32 in FIG. 5; a system for delivering additive, such as fertilizer, etc., as shown schematically at 34 in FIG. 6; a system for ground treatment before or after seed is planted and before or after crop grows and is harvested, as shown at 36 in FIG. 7, etc. Basically, the centrifugal fan 10 is intended for use in any piece of equipment used in a field or at a location whereat crop is planted, harvested, or handled and wherein during the process of preparing soil for planting, planting seeds or plants, treating the soil or crop with additives, or handling crop and debris, as during harvest, foreign matter is entrained in air handled by the centrifugal fan. However, as noted above, while the centrifugal fan 10 is highly suitable for the agricultural environment, it is intended to be used in virtually any environment in which an abrasive material is handled with an air supply drawn into and expelled from a centrifugal fan chamber. The schematic showing in FIG. 1 is intended to encompass all such environments.

One specific form of the invention will be described hereinbelow. It should be understood that this form of the centrifugal fan 10 is exemplary in nature only and should not be viewed as limiting.

Referring now to FIGS. 8-15, the fan 10 is shown incorporated into a harvesting unit 38, such as described in U.S. Pat. No. 9,480,203, the disclosure of which is incorporated herein by reference.

Figures 12, 13, 14, 15, 16:
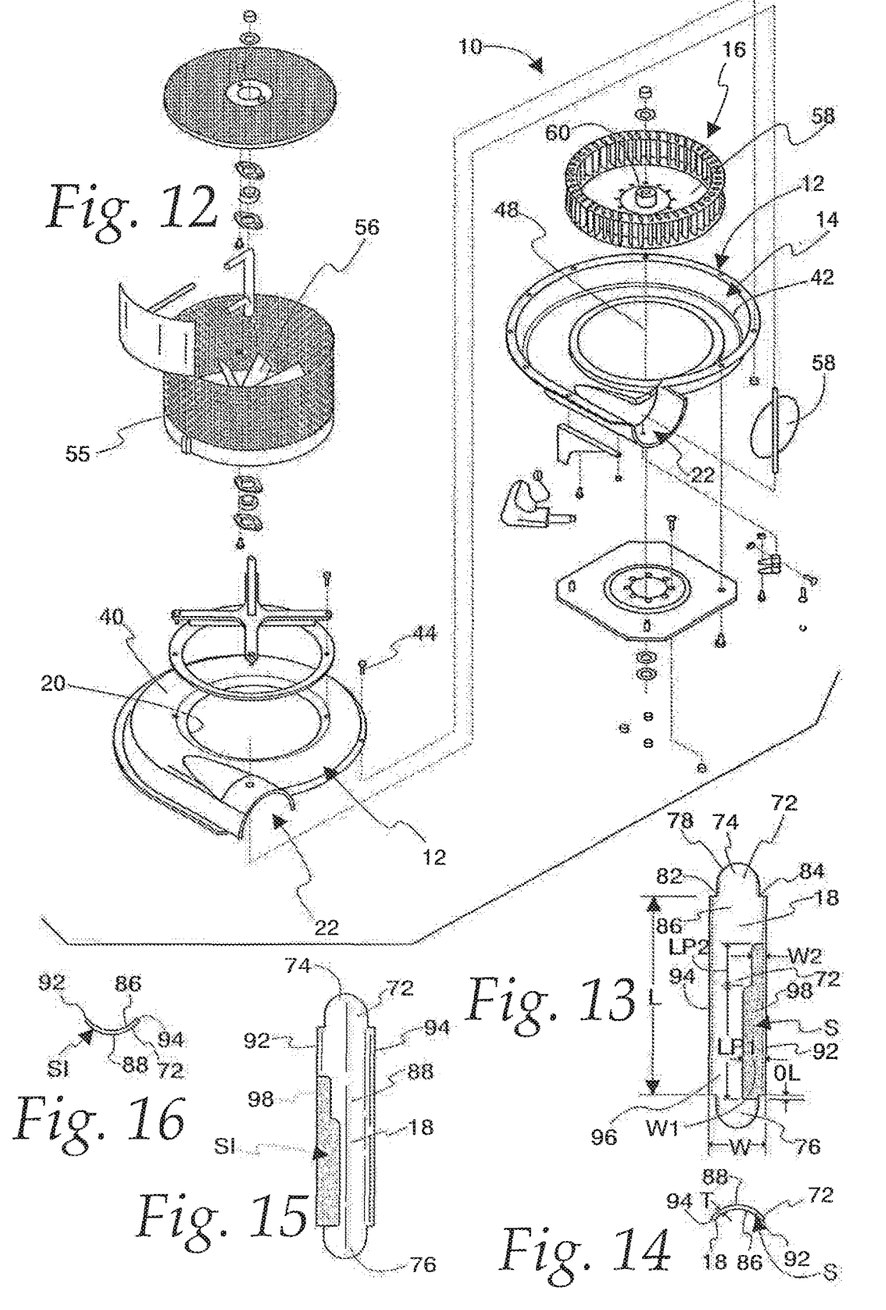
FIG. 12 is an exploded, perspective view of the centrifugal fan in FIG. 8.
FIG. 13 is an elevation view of one side of a blade on the rotor in FIGS. 9-11.
FIG. 14 is an end view of the blade in FIG. 13.
FIG. 15 is an elevation view of the blade from the side opposite that in FIG. 13.
FIG. 16 is an end view of the blade in FIG. 15.

The housing 12 consists of flanged halves 40, 42 that are secured together through a plurality of fasteners 44 to cooperatively bound the chamber 14 within which the rotor 16 operates. The rotor 16 is carried on a shaft 46 mounted to the housing 12 for rotation around an axis 48. The shaft 46 is turned by a drive 50 that may be a power take-off on a vehicle 52 that advances the harvesting unit 38. Alternatively, the drive 50 may be an independent power source. As one example, the drive 50 may incorporate a gear box driven by a hydraulic motor.

Figure 8:
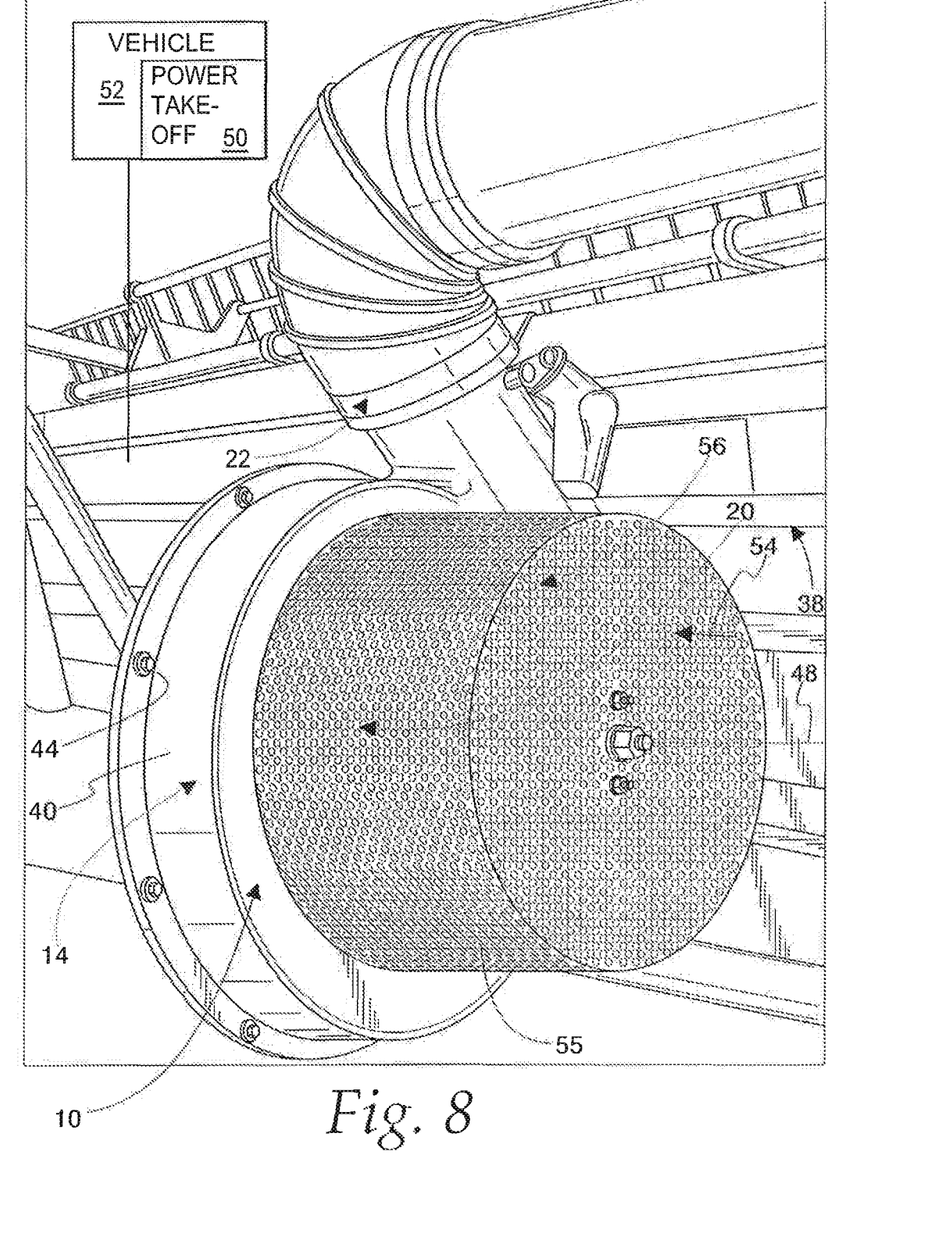
FIG. 8 is a fragmentary perspective view of one specific form of centrifugal fan, as shown schematically in FIG. 1, and incorporated into an agricultural harvesting unit.
Figure 9:
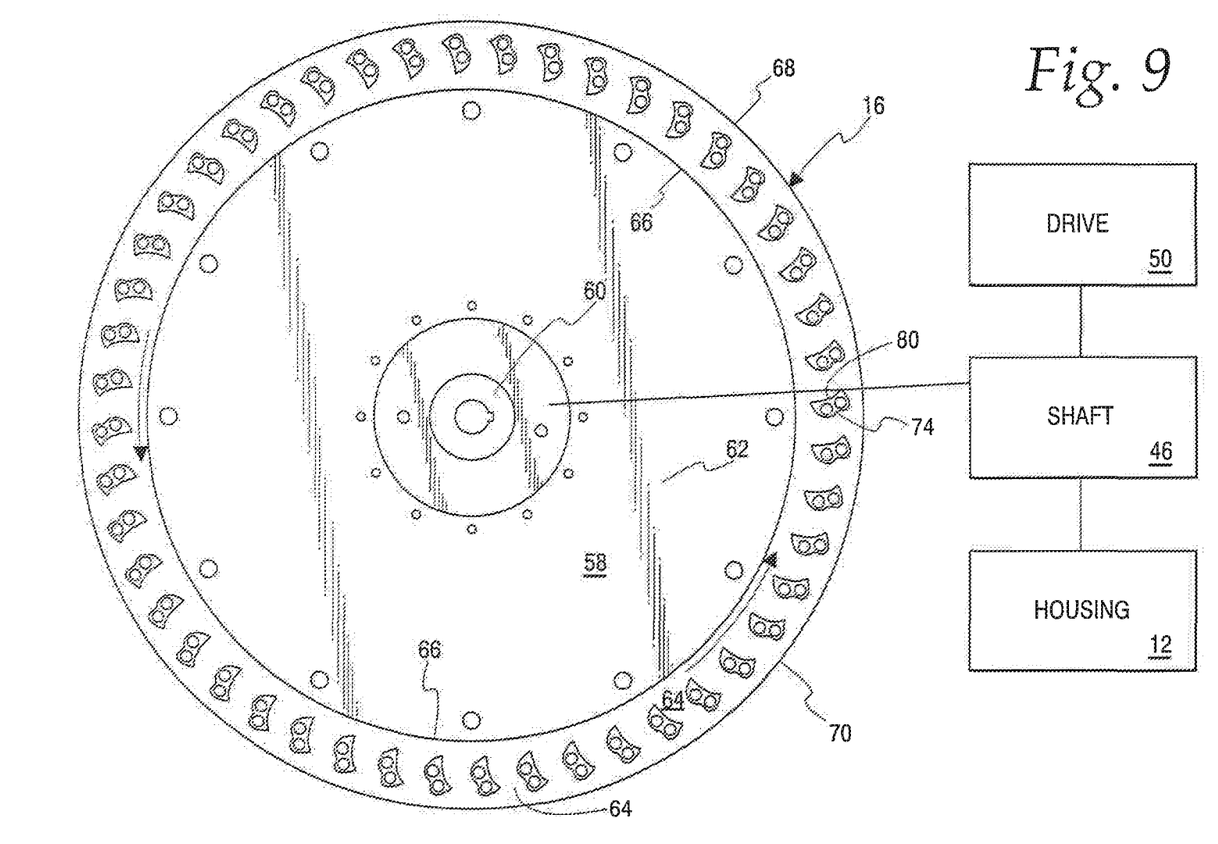
FIG. 9 is an enlarged, end view of a rotor on the centrifugal fan in FIG. 8.
Figure 10:
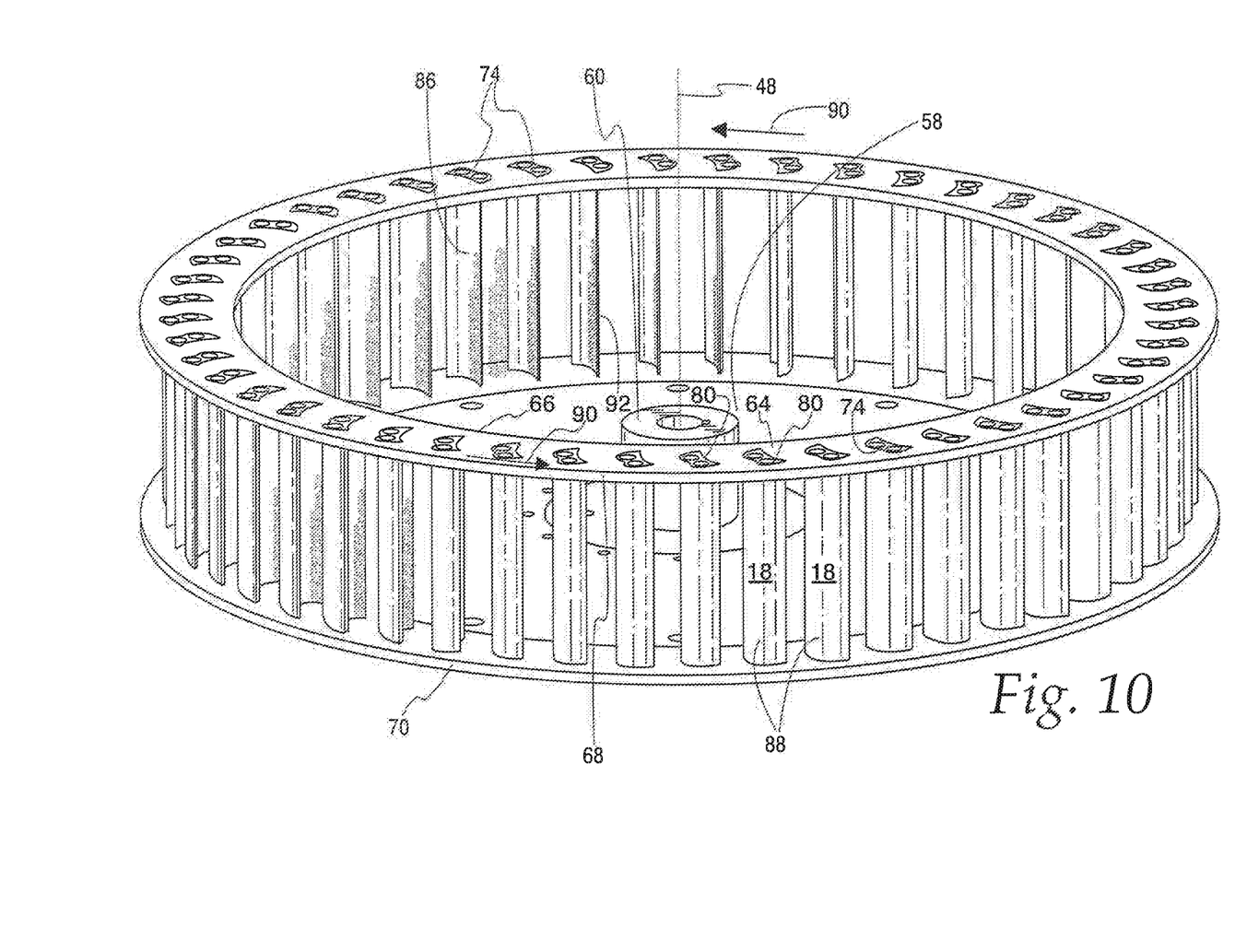
FIG. 10 is a view of the rotor in FIG. 9 from a different perspective.
Figure 11:
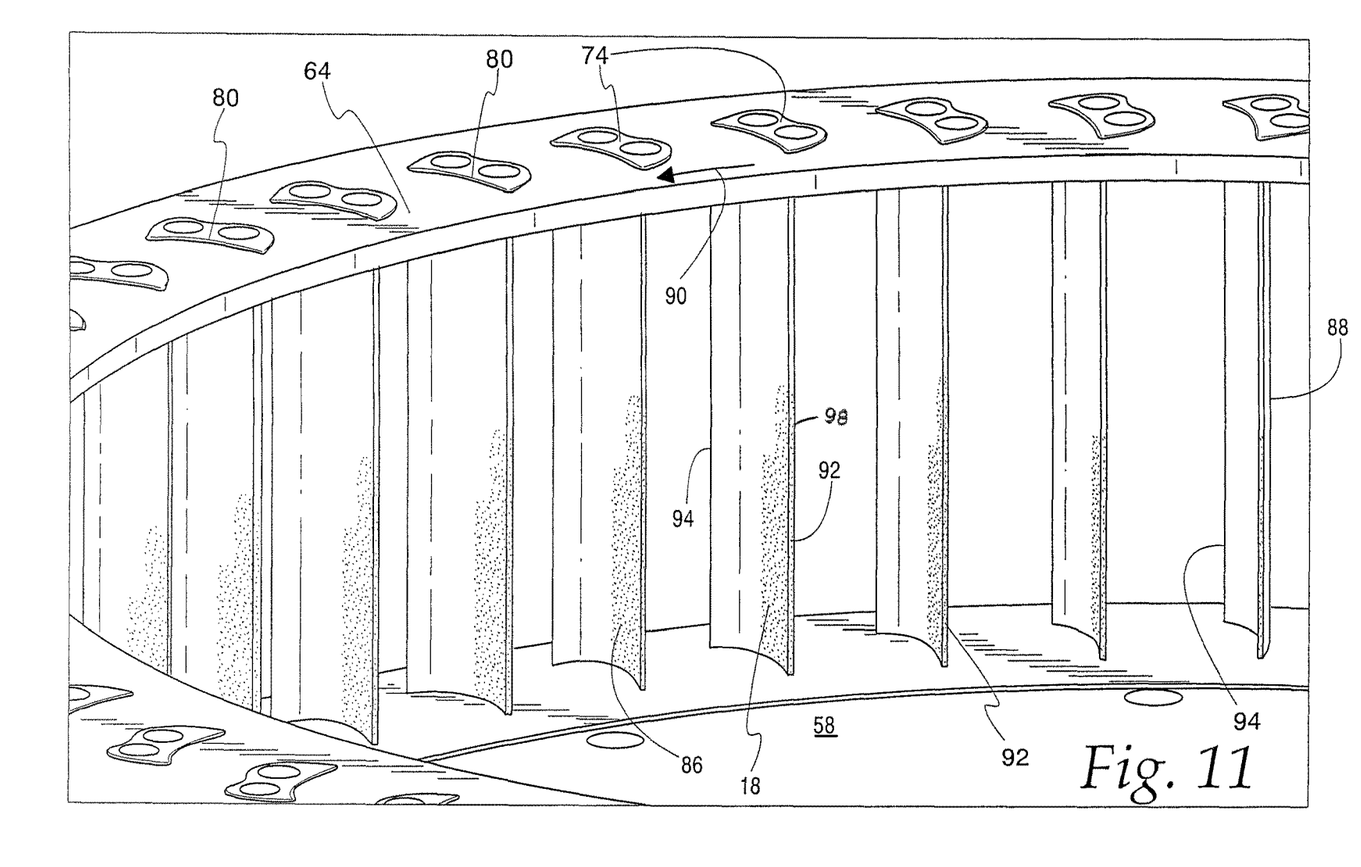
FIG. 11 is a further enlarged, fragmentary, perspective view of the rotor in FIGS. 9 and 10.

The housing 12 has an opening defining the inlet 20 that allows incoming air to flow into the chamber 14 in an axial direction, as indicated by the arrow 54 in FIG. 8.

A cup-shaped screen 55 is placed over the inlet 20 to prevent intake of large particles that might accumulate on the rotor 16 or otherwise interfere with high-efficiency, trouble-free operation of the fan 10. The screen 55 extends around an impeller 56 that rotates with the shaft 46 and draws atmospheric air towards the inlet 20.

The housing 12 defines the outlet 22 at which an adjustable baffle assembly 57 is provided to allow controlled variation in discharge volume for the pressurized air.

The rotor 16 has a squirrel cage construction including a wall 58 with a fitting 60 that connects to the shaft 46 in a keyed manner so that the wall 58 follows rotary movement of the shaft 46. Air incoming through the inlet 20 impinges upon an axially facing surface 62 of the wall 58.

The rotor 16 further includes a blade mounting ring 64 with inner and outer annular edges 66, 68. The outer edge 68 has a diameter substantially equal to that of an annular outer edge 70 of the wall 58. The blade mounting ring 64 and wall 58 together define a frame upon which the blades 18 are mounted.

A plurality of the blades 18, of like construction, are mounted between the wall 58 and ring 64 in circumferentially spaced relationship at regular intervals. The blades 18 are spaced a distance from the axis 48.

Each of the blades 18 has a body 72 defining that portion of the blade 18 responsible for air movement. For purposes of the description herein, the dimensions of the blades 18 will be described with respect to the portions thereof defined by the bodies 72.

The body 72 has an axial length L and a radial width W. These dimensions are in relationship to the operating axis 48 for the rotor 16. Mounting tabs 74, 76 extend from the opposite lengthwise ends of the body 72. With the exemplary tab 74, a rounded perimeter edge 78 can be guided through a slot 80 in the ring 64. By advancing the tab 74 into the slot 80, edges 82, 84, between which the tab 74 resides, can be brought into abutting relationship with the ring 64, whereupon the tab 74 can be bent at approximately 90° thereby to cause the thickness of the ring 64 to be captively held between the tab 74 and the edges 82, 84. The opposite end of the body 72 is mounted to the wall 58 through the tab 76 in like manner. With all blades 18 assembled in this manner, the blades 18, ring 64, and wall 58 define a rigid unitary structure that makes up the primary structural unit of the rotor 16.

While the blades 18 could potentially be flat, "radial" blades, as depicted, the blades 18 are curved, whereby the rotor 16 can be turned in one direction around the axis 48 so that the blades 18 have a forward-curved construction, or turned in the opposite direction so that the blades have a backward-curved construction. As seen clearly in FIG. 14, the blade 18 has circumferentially oppositely facing concave and convex surfaces 86, 88, respectively.

While not limited to this construction, the rotor 16 turns in the direction of the arrow 90 around the axis 48, whereby the blades 18 have a forward-curved construction with the concave surface 86 leading to engage the air within the chamber 14. With this construction, the axially extending edge 92 is a leading edge, with the axially extending edge 94 a trailing edge. The surfaces 86, 88 each extends in a curved manner fully between the leading and trailing edges 92, 94. With the construction depicted, the trailing edge 94 is radially outside of the leading edge 92.

The blades 18 depicted may each be formed from a flat sheet of uniform thickness T (FIG. 14) which, in a representative case, is in the range of 0.05 to 0.07 inches, The thickness could, however, be considerably outside (above or below) this range. The sheet material defines a substrate layer 96 for each blade body 72. The substrate layer 96 on each blade 18 may be made from any of a number of different metal materials. As examples, the blade material may be aluminum, steel, magnesium, etc. The material is chosen taking into account its cost, weight, resistance to wear, etc.

According to the invention, the blades 18 have a material at 98 bonded at the leading edge 92 and over only a portion of the exposed areas of one of the surfaces 86, 88. With the forward-curved blade construction depicted, the bonded material 98 is on the concave surface 86.

The material 98 is strategically bonded to discrete regions of the leading edge 92 and concave surface 86 to increase the resistance to abrasive wear while at the same time not adding significant mass or weight to each of the blades. Thus, drive capacity may not have to be increased as might be necessitated when thicker blade stock is used. Preferably, the bonded material 98 on the substrate layer 96 will be a metal. The metal may be the same as, or different than, the metal making up the substrate layer 96.

As seen most clearly in FIG. 13, the bonded material 98 is applied as to define an elongate strip form at S. In the depicted form, which should not be viewed as limiting, the strip S extends over less than the full axial lengths of the leading edge 92 and the surface 86, and less than the full radial width of the surface 86.

The strip S has two axial length portions LP1, LP2. The length portion LP1 has a radial width W1 that is greater than a radial width W2 of the length portion LP2. Both strip length portions LP1, LP2 extend up to or adjacent to the leading edge 92.

The width W1 of the strip S is less than one-half the radial width W of the blade 18.

Exemplary blade and strip dimensions are provided below with reference to FIG. 13. It should be understood that these are just representative of one exemplary form.

W=0.92 inches
L=3.2 inches
W1=0.345±0.04 inches
W2=0.2±0.04 inches
LP1=1.75±0.25 inches
LP1+LP2=2.50±0.25 inches
OL (overlap length of strip S onto tab 76)=0.06 to 0.07 inches In one preferred form, the bonded material 98 has a thickness of at least 0.02 inches. In the form shown, the bonded material has a thickness equal to at least one-third the thickness of the substrate layer 96.

In one preferred form, the bonded material 98 is applied through a laser cladding process. This is a well-known process that metallurgically bonds two generally dissimilar metal materials. As used herein, cladding is also intended to encompass the use of the same materials. Using a laser process, the base metal of the substrate layer 96 is pooled preparatory to applying the bonded material 98.

With the laser application, the substrate layer 96 and bonding material 98 are metallurgically bonded. In one preferred form, multiple beads are formed along the axial length L and overlapped. For example, one bead may be formed with a strip width W2 over the full strip length (LP1+LP2). A separate bead may be formed over the strip width LP1 to form the widened portion of the strip S.

Kondex Corporation of Lomira, Wisconsin currently offers hard-faced materials suitable for laser cladding the blades. While the Kondex compositions are proprietary to Kondex Corporation, one skilled in the art could select a number of different materials suitable to perform the laser cladding.

With a backward-curved construction, the strip S1, corresponding to the strip S, would be applied as shown in FIGS. 15 and 16.

The foregoing disclosure of specific embodiments is intended to be illustrative of the broad concepts comprehended by the invention.

The invention claimed is:

1. A centrifugal fan rotor comprising:
a frame having a rotary axis; and
a plurality of blades on the frame at circumferentially spaced locations around the rotary axis,
the plurality of blades each having a leading edge and a trailing edge radially outside of the leading edge,
the plurality of blades each having circumferentially oppositely facing first and second surfaces each extending between respective leading and trailing edges,
the plurality of blades each having a thickness between respective first and second surfaces,
each of the first and second surfaces having an exposed area,
wherein the plurality of blades each has a material bonded on the leading edge and over only a portion of the exposed surface area of one of the first and second surfaces,
wherein the leading edge of each of the plurality of blades has an axial length and the material is bonded over only a portion of the axial length of the leading edge of each of the plurality of blades,
the thickness of each of the plurality of blades being substantially uniform over the portion of the exposed surface area of the one of the first and second surfaces to which the material is bonded.

2. The centrifugal fan rotor according to claim 1 wherein the blades are made from a base metal and the bonded material comprises metal.

3. The centrifugal fan rotor according to claim 2 wherein the bonded metal is different than the base metal.

4. The centrifugal fan rotor according to claim 1 wherein each of the plurality of blades is spaced from the rotary axis and all of the plurality of blades have either a forward-curved or backward-curved shape.

5. The centrifugal fan rotor according to claim 1 wherein each of the plurality of blades has an axial length and a radial width and the material on each of the plurality of blades is bonded to the exposed area of one of the first and second surfaces over less than a full extent of each of the axial blade length and radial blade width.

6. The centrifugal fan rotor according to claim 1 wherein each of the plurality of blades has an axial length and a radial width and the material on each of the plurality of blades is bonded to the exposed area of one of the first and second surfaces in an elongate strip form adjacent the leading edge.

7. The centrifugal fan rotor according to claim 6 wherein the strip has a radial width and an axial length and the radial width of the strip is less than one half the radial width of the blade.

8. The centrifugal fan rotor according to claim 1 wherein the bonded material is applied through a laser cladding process.

9. The centrifugal fan rotor according to claim 8 wherein each of the plurality of blades comprises a substrate layer made from a base material having a first thickness and the bonded material has a second thickness equal to at least one third the first thickness.

10. The centrifugal fan rotor according to claim 9 wherein the substrate layer is a formed flat sheet with a substantially uniform thickness to which the bonded material is applied.

11. The centrifugal fan rotor according to claim 1 wherein the material is bonded to each of the plurality of blades on only one of the first and second surfaces.

12. The centrifugal fan rotor according to claim 1 wherein the centrifugal fan rotor has a wall with an axially facing surface, each of the plurality of blades having an axial length between spaced ends and one of the spaced ends on each of the plurality of blades is connected to the wall.

13. The centrifugal fan rotor according to claim 12 wherein the bonded material on the one of the first and second surfaces on each of the plurality of blades extends on each of the plurality of blades from the one blade end towards but not to the other blade end.

14. The centrifugal fan rotor according to claim 10 wherein the flat sheet thickness is in the range of 0.05-0.07 inches.

15. The centrifugal fan rotor according to claim 1 wherein the bonded material increases the blade thickness and has a thickness of at least 0.02 inches.

16. The centrifugal fan rotor according to claim 1 in combination with: a) a housing bounding a chamber within which the centrifugal fan rotor resides and defining an inlet for communicating incoming air to the chamber and an outlet for communicating air pressurized in the chamber by the centrifugal fan rotor from the chamber; and b) a drive for turning the rotor around the rotary axis.

17. The combination of claim 16 wherein each of the plurality of blades has a forward-curved shape.

18. The combination of claim 16 further in combination with a piece of agricultural equipment that uses at least one of a pressurized air supply and vacuum to at least one of: a) plant crops; b) harvest crops; c) treat crops or ground in which crops are planted; d) handle crops; e) handle agricultural debris; and f) prepare ground for planting of crops.

19. The centrifugal fan rotor according to claim 7 wherein the radial width of the strip is not constant over the axial length of the strip.

20. The centrifugal fan rotor according to claim 7 wherein a first part of the strip has a radial width that is less than a radial width of another part of the strip spaced axially from the first part of the strip, the first and another strip parts each having an axial extent.

21. The centrifugal fan rotor according to claim 1 wherein the leading and trailing edges are spaced from each other.

22. The centrifugal fan rotor according to claim 1 wherein the leading and trailing edges are substantially straight.

23. The centrifugal fan rotor according to claim 22 wherein the leading and trailing edges are substantially parallel to each other and the rotary axis of the frame.

24. The centrifugal fan rotor according to claim 1 wherein the leading edge has a length that is substantially parallel to the rotary axis of the frame.

25. A centrifugal fan rotor comprising:

a frame having a rotary axis; and a plurality of blades on the frame at circumferentially spaced locations around the rotary axis, the plurality of blades each having a leading edge and a trailing edge radially outside of the leading edge, the plurality of blades each having circumferentially oppositely facing first and second surfaces each extending between respective leading and trailing edges, each of the first and second surfaces having an exposed area, wherein the plurality of blades each has a material bonded at over only a portion of the leading edge and over only a portion of the exposed surface area of one of the first and second surfaces, the centrifugal fan rotor provided in combination with: a) a housing bounding a chamber within which the centrifugal fan rotor resides and defining an inlet for communicating incoming air to the chamber and an outlet for communicating air pressurized in the chamber by the centrifugal fan rotor from the chamber; and b) a drive for turning the rotor around the rotary axis, the centrifugal fan rotor provided further in combination with a piece of agricultural equipment that uses at least one of a pressurized air supply and vacuum to at least one of: a) plant crops; b) harvest crops; c) treat crops or ground in which crops are planted; d) handle crops; e) handle agricultural debris; and f) prepare ground for planting of crops.

\* \* \* \* \*